United States Patent [19]
Murry

[11] 3,735,159
[45] May 22, 1973

[54] METHOD AND APPARATUS FOR TRANSLATING ULTRASONIC ENERGY

[76] Inventor: Edward J. Murry, 9223 West 119th St., Palos Park, Ill. 60494

[22] Filed: Jan. 24, 1972

[21] Appl. No.: 220,096

[52] U.S. Cl.......310/8.3, 259/DIG. 41, 259/DIG. 44, 310/8.2, 310/9.1
[51] Int. Cl. .............................................H04r 17/00
[58] Field of Search............................310/8, 8.2, 8.3, 310/8.7, 9.1, 9.4; 259/1 R, DIG. 15, DIG. 41, DIG. 44

[56] References Cited
UNITED STATES PATENTS

| 2,565,158 | 8/1951 | Williams | 310/8.7 |
| 3,058,014 | 10/1962 | Camp | 310/8.7 |

Primary Examiner—J. D. Miller
Assistant Examiner—Mark O. Budd
Attorney—Carlton Hill, Benjamin H. Sherman, Charles F. Meroni et al.

[57] ABSTRACT

A novel method and apparatus for converting vibratory energy in the radial direction into vibratory energy in the longitudinal direction by forming a tapered surface on a piezoelectric element and attaching it to a mating transition member which has a corresponding tapered surface.

13 Claims, 12 Drawing Figures

Patented May 22, 1973 3,735,159

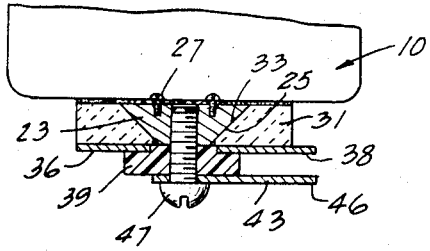
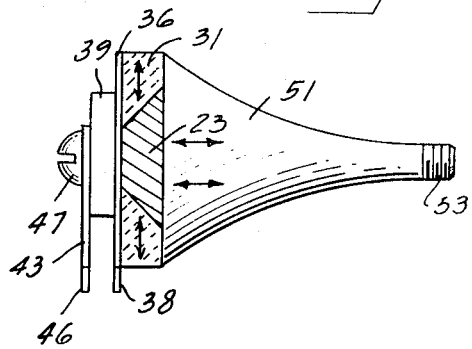
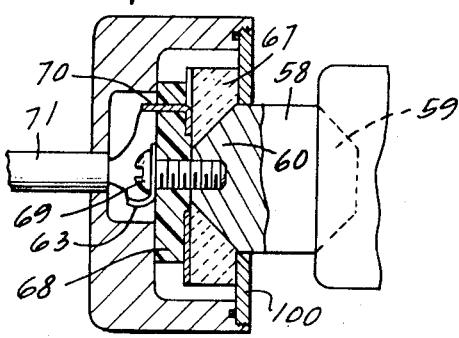
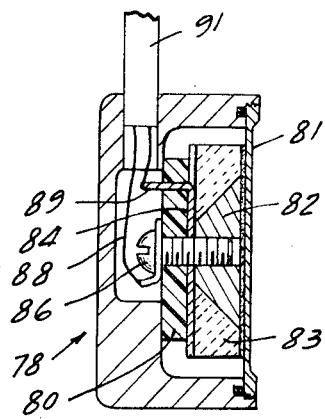
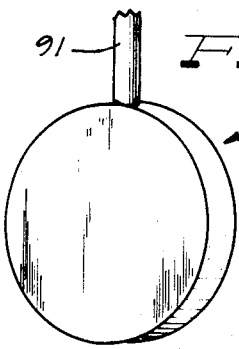
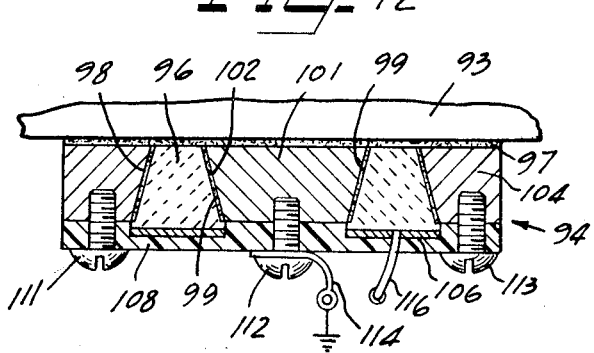

3,735,159

METHOD AND APPARATUS FOR TRANSLATING ULTRASONIC ENERGY

BACKGROUND OF THE INVENTION

1. Field of the Invention

This invention relates in general to ultrasonic transducers and in particular to an improved apparatus and method of converting vibratory ultrasonic energy from a radial to a longitudinal direction.

2. Description of the Prior Art

It has been known to propagate ultrasonic vibratory energy into cleaning fluids or other liquids or materials, but this has generally required single blocks of fairly expensive ceramics which are fabricated by complex manufacturing techniques and which must be one-quarter wave length long. Also, Langevin-type sandwiches having a composite mass load of one-half wave length have been used for generating of longitudinal ultrasonic vibrations. The Langevin "sandwich" method does not require an excessively high operating voltage and is extremely efficient. This method also does not require excessive amounts of ceramic material.

It has also been known to utilize ring-or disc-type ceramic piezoelectric transducers which vibrate in many complex modes and which may be polarized to emphasize one or the other of the modes as desired. If the radial mode is selected, it is possible to use a lower, more efficient, frequency for most purposes which is also more effective in the utilization of the energy. The problem is to convert the radial motion of the transducer into up and down longitudinal vibrations. Previously this has not been possible and usually thin, fragile discs of a fairly low radial vibratory frequency but of a very high longitudinal frequency have been connected to the bottom of cleaning tanks or transformation concentrators by cementing and thereby hopefully vibrating the attached structures usually in some form of inefficient flexural vibration. However, the vector forces at the interface are very unfavorable and low efficiency and low effectiveness in conversion of the energy has resulted. Where horn devices have been used, very little of the required longitudinal vibrations have been obtained.

SUMMARY OF THE INVENTION

The present invention relates to apparatus and method of directly converting radial vibrations to longitudinal vibrations by utilizing a radially polarized ring piezoelectric transducer which allows low voltage and low frequency design and is inexpensive, and, which has a tapered surface that mates with the tapered surface of a translation member which is attached to the load such that the radial vibrations of the crystal are converted into longitudinal vibrations and supplied to the load.

It is another object of the invention to provide means and method for coupling sonic or ultrasonic energy directly and efficiently into a test object or fluid with a simple and inexpensive transducer.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 7 is a sectional assembly view through the invention as used in FIGS. 3 and 4;

FIG. 8 illustrates the invention connected to an impedance transformer assembly as shown in FIG. 4;

FIG. 9 is a sectional view of a modification of the invention as applied to a pulser for N.D.T. (Non-Destructive Testing);

FIG. 10 is a sectional view of a modification of the invention as used in a submersible transducer or sonar;

FIG. 11 is an outside perspective view of the submersible transducer; and

FIG. 12 is a sectional view of a modified form of the invention.

DESCRIPTION OF THE PREFERRED EMBODIMENTS

Figure 1:
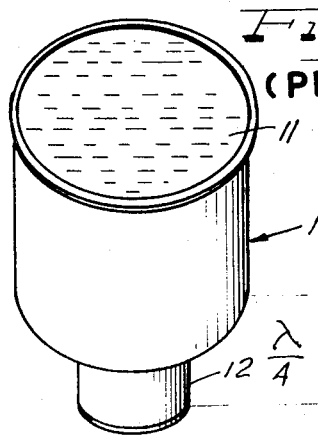
FIG. 1 is a view of a tank containing a liquid with a ¼ wave transducer of the prior art attached to its bottom.

FIG. 1 illustrates a structure of the prior art wherein a tank 10 contains a liquid 11 and to which a ceramic transducer 12 has been mounted on the bottom thereof. The transducer 12 is made of expensive ceramic and must be fabricated by complex manufacturing techniques and must be about one-quarter wave length long. Such structure is capable of generating longitudinal vibrations but is expensive and complex.

Figure 2:
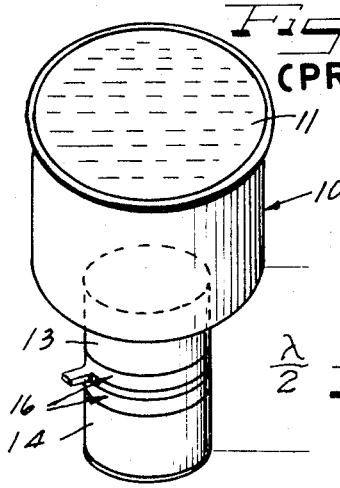
FIG. 2 is a view of a tank with a prior art Langevin type transducer connected to its bottom.

FIG. 2 illustrates another prior art device wherein two ceramic transducers 16 are mounted between a pair of metal members 13 and 14 to form a Langevin sandwich and the structure is attached to the bottom of the tank 10. Such structure utilizes a composite mass load of one-half wave length and does not utilize as much expensive ceramic material as the embodiment of FIG. 1 or as high a voltage.

It has been known in the prior art that a ring- or disc-type ceramic piezoelectric transducer has many complex modes of vibrations but that it may be polarized to emphasize one or the other of the modes if desired. By selecting the radial mode, it is possible to use a lower, more efficient frequency for most purposes which is also more effective. However, prior to this invention it has not been possible to convert the radial back and forth vibrations into longitudinal up and down vibrations.

Figure 4:
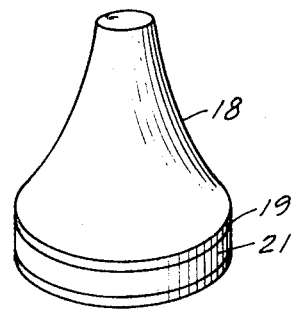
FIG. 4 illustrates a horn using the device disclosed herein.
Figure 3:
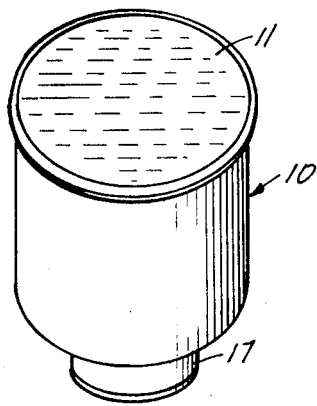
FIG. 3 is a view of a tank using the device disclosed herein.

In the prior art, usually thin, fragile discs of a fairly low radial vibratory frequency have been utilized similar to the disc 17 attached to the container 10 in FIG. 3. Such modified discs have a fairly low radial vibratory frequency but a very high longitudinal frequency and have been merely cemented to the bottom of the tank 10, or alternatively, have been connected, quite uselessly, as shown in FIG. 4 to a transformation concentrator such as 18 in FIG. 4 wherein an unmodified crystal 21 is attached by cement 19 to the large end of the truncated conical concentrator 18. In the structure of FIG. 3 vibrations in a complex mode have occurred in the form of inefficient flexural vibration. Since the vector forces involved at the interfaces are very unfavorable, low efficiency and effectiveness have resulted. Also, in the transformer concentration horn 18 of FIG. 4, very little, if any, of the desired longitudinal vibrations are obtained.

Figure 5:
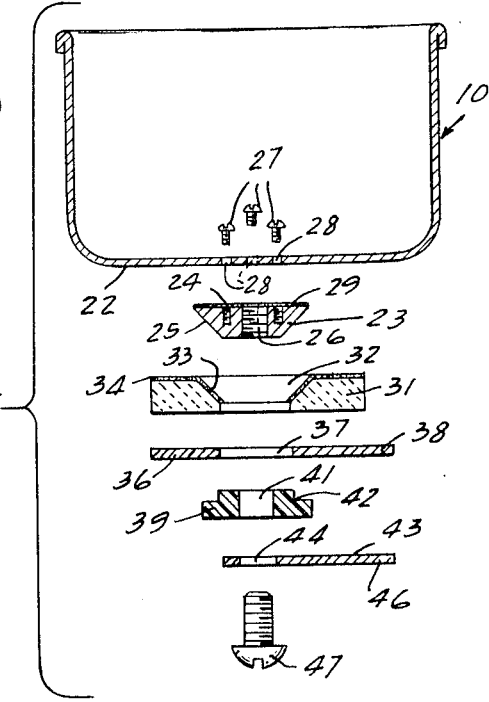
FIG. 5 is an exploded view of the novel translating transducer of this invention as used in FIGS. 3 and 4.
Figure 6:
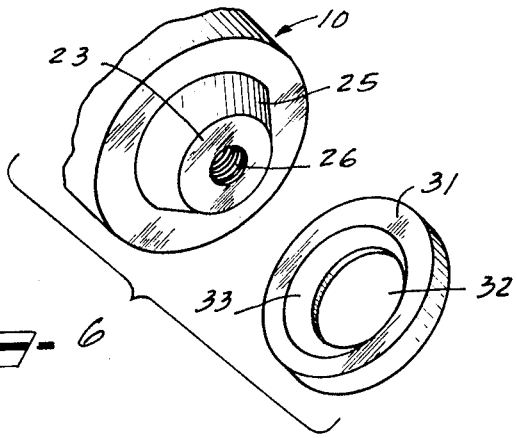
FIG. 6 is an enlarged detailed view of the annular crystal and translation member of this invention used in FIGS. 3 or 4.

FIGS. 5–7 illustrate one embodiment of the present invention for efficiently converting radial vibrations to longitudinal energization.

FIG. 5 illustrates a transition member 23 of generally truncated conical shape which has its largest diameter base attached to the bottom 22 of the tank 10. It may be attached by cement 29 or alternatively by bolts 27 which pass through openings 28 in the bottom of the tank 22 and are received in mating threaded openings 24 formed in the transition member 23. The transition member 23 is formed with a central threaded opening 26 for a purpose to be described later. The taper of the outer surface 25 of the member 23 may be 45°. The transition member 23 may be made of aluminum, as for example 7075–T6 aluminum, which has acoustic impedance that approximates that of the piezoelectric material. An annular piezoelectric crystal member 31 is formed with a mating tapered conical opening 32 which fits over and engages the surface 25 of the transition 23. The surfaces 25 and 33 are machined or ground to a high class ultrasonic fit so as to make intimate contact for high ultrasonic efficiency. The ring 31 is also attached to the bottom of the tank 10 by cement 34 and an electrically conducting washer 36 is mounted on the crystal 31. The washer 36 has a central opening 37 which aligns with the opening 32 of the crystal. A portion 38 extends and forms an electrical contact for the side of the crystal away from the bottom 22 of the tank. A grommet 39 is formed with a central opening 41 and a shoulder 42 and is received in the opening 37. The grommet 39 is made of insulating material and the opening 41 is smaller than the smallest diameter of the opening 32 in the crystal 31. A second electrical contact 43 is formed with an extension 46 to form a second electrical contact and is formed with a central opening 44 through which a compressive bolt 47 extends.

FIG. 7 illustrates the structure in assembled relationship and it is to be noted that the tab 46 provides electrical contact through the bolt 47 and the transition member 23 to the tapered face 33 of the crystal and thus an electrical potential can be applied to the crystal between the members 36 and 43.

FIG. 6 is an enlarged exploded view of the crystal 31 and the transition member 23.

When electrical power is applied to the terminals 38 and 46 the crystal 31 vibrates in the radial mode and these vibrations impinge on the transition member 23 and are converted to longitudinal vibrations due to the longitudinal component of the radial vibrations which occur on the surfaces 33 and 25. Thus the radial vibratory energy which can be generated at a much lower frequency directly and efficiently is converted into energy in a longitudinal mode as shown. Efficient longitudinal vibrations are applied to the bottom 22 of the tank.

FIG. 8 illustrates an embodiment wherein the longitudinal vibrations are applied to a transformer concentrator or impedance transformer 51 which is sometimes designated as a horn. A tool may be threadedly attached to a small threaded portion of the generally conical shaped horn 51 and the transition member 23 and crystal 31 may be attached to the large base end of the horn 51. The electrical contacts 36 and 43 and insulating member 39 with compression bolt 47 may be provided in the same fashion as in FIG. 7. The members 23 and 31 may be attached to the base of the member 51 by cement or in other suitable fashion. Thus the structure of FIG. 8 provides for high energy longitudinal vibrations from the end 53 of the horn.

FIG. 9 illustrates a small test transducer of the flaw-profile form for applying sonic energy to test specimens such as required in Non-Destructive Testing (NDT). In this structure an output member 58 is formed with a conical coupling end 60 which mates with the conical surface of a crystal 67. The transition member 58 may be formed with a sonic concentrator end 59. An electrical insulator washer 68 is held by the compression screw 69 and bears against the crystal 67 and member 58. A case member 56 encloses the crystal and has a supply lead with a shield 71 which has a shielded grounded conductor 63 which is connected electrically to the compression bolt 69 and thus to the transition member 58. A second lead 70 extends through the insulating member 8 and is electrically connected to a surface of the crystal away from the transition member 58. Member 58 is supported by disc 100 from member 56.

In operation, electrical energy is applied to the crystal through the leads and the crystal oscillates in radial direction and these oscillations are converted into longitudinal oscillations in the transition member 58 and applied to the load.

FIG. 10 illustrates a submersible type transducer comprising a housing 78 in which is mounted a diaphragm 81 which is sealed by an O-ring to the housing 78. A transition member 82 is attached to the diaphragm 81 and an annular piezoelectric ring member 83 is formed with a beveled surface and mates with the beveled surface of the transition member 82. An insulating disc 80 and conducting washer 84 are mounted adjacent the crystal 83 and a compression bolt 86 is threadedly received in the transition member 82 to hold the assembly together. Electrical supply lead 91 has conductors 88 and 89 respectively connected to the compression bolt 86 and the conducting washer 84.

FIG. 11 illustrates the submersible transducer 78 in perspective view with the supporting electrical lead 91.

FIG. 12 illustrates a modification of the invention wherein a load 93 has a transducer 94 attached which has two 45° faces. An annular shaped ceramic crystal 96 is bonded to the load 93 by cement 97 and is formed with two tapered 45° faces 98 and 99. An external transition ring 104 mates with the face 98 of the crystal 96. A central transition member 101 shaped with a tapered edge 102 mates with the face 99 of the crystal 96. Conductor ring 106 is attached to the large end of the ceramic crystal 96 and electrical lead 116 extends through an insulating disc 108 and is attached thereto. Compression bolts 111, 112 and 113 attach the insulating ring 108 to the transition members 104 and 101. Electrical lead 114 is connected to the compression bolt 112 which connects to member 101 and applies ground potential to the crystal 96 through the member 101. The second lead 116 extends through the member 108 and connects to ring 106 and provides the second electrical input to the crystal 96.

In this embodiment the crystal is caused to osciallate transversely relative to FIG. 12 and this energy is converted into longitudinal energy and supplied to the load 93 due to the tapered surfaces 98 and 99. Since there are two surfaces of transition from radial to longitudinal energy, the efficiency and amount of radial energy supplied by the crystal 96 is substantially increased.

It can be seen that this invention provides for a new and improved piezoelectric transducer although it has been described with respect to preferred embodiments it is not to be so limited as changes and modifications may be made therein which are within the full intent and scope as defined by the appended claims.

What I claim is:

1. Apparatus for converting radial vibrations in a piezoelectric member to longitudinal vibrations comprising:
   a surface of said piezoelectric member tapered relative to radial vibrations of said member;
   a transition member mounted to said piezoelectric member and formed with a mating tapered surface and engageable with said tapered surface of said piezoelectric member; and
   means for generating radial vibrations in said piezoelectric member.

2. Apparatus according to claim 1 wherein said piezoelectric member is annular in shape and said tapered surface is formed about the central opening and said transition member is conical so as to mate with said tapered surface.

3. Apparatus according to claim 1 wherein said piezoelectric member is annular in shape and said tapered surface is formed about said outer edge thereof and said transition member is annular in shape and said mating tapered surface is formed about the central opening thereof.

4. Apparatus according to claim 3 wherein said piezoelectric member is formed with a second tapered surface about the central opening, a second conical transition member mounted within said central tapered opening and the first and second tapered surfaces tapered in directions such that longitudinal vibrations in said first and second transition member extend in the same direction.

5. Apparatus according to claim 1 wherein said transition member is formed of metal.

6. Apparatus according to claim 5 wherein said transition member is formed of aluminum.

7. Apparatus according to claim 1 wherein a load is attached to said piezoelectric and transition members.

8. Apparatus according to claim 7 wherein said means for generating radial vibrations in said piezoelectric member includes a first electrical conductor connected to said piezoelectric member on the side away from said load and a second electrical conductor connected to said transition member.

9. Apparatus according to claim 8 wherein said first electrical conductor is washer-shaped.

10. Apparatus according to claim 1 wherein a conical shaped horn is attached to said piezoelectric and transition members to receive longitudinal vibrations therefrom.

11. Apparatus according to claim 1 wherein a diaphragm is attached to said piezoelectric and transition members, and a housing encloses said members and is formed with an opening covered by said diaphragm.

12. Apparatus according to claim 1 wherein said transition member has a portion of reduced cross section at its end away from said mating tapered surface.

13. The method of converting radial vibrations in a piezoelectric member to longitudinal vibrations comprising the steps of:
   forming a surface on said piezoelectric member which is tapered relative to radial vibrations therein;
   forming a transition member with a mating tapered surface; and
   connecting said piezoelectric and transition members together with the tapered surfaces together to convert radial vibrations into longitudinal vibrations.

* * * * *